(12) United States Patent
Ohishi

(10) Patent No.: US 6,940,923 B2
(45) Date of Patent: Sep. 6, 2005

(54) DEMODULATING DEVICE, BROADCASTING SYSTEM, AND SEMICONDUCTOR DEVICE

(75) Inventor: Syouji Ohishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 722 days.

(21) Appl. No.: 10/107,048

(22) Filed: Mar. 28, 2002

(65) Prior Publication Data

US 2003/0007575 A1 Jan. 9, 2003

(30) Foreign Application Priority Data

Jul. 3, 2001 (JP) .................................. 2001-201982

(51) Int. Cl.[7] .................... H04L 27/38; H04L 27/233
(52) U.S. Cl. ................. 375/326; 375/327; 375/376; 331/25; 329/307
(58) Field of Search ............................. 375/278, 284, 375/322, 324, 326–328, 343, 373–376; 331/17, 18, 25, DIG. 2; 329/307

(56) References Cited

U.S. PATENT DOCUMENTS 5,471,508 A * 11/1995 Koslov .................. 375/344
6,751,270 B1 * 6/2004 Choi et al. ............. 375/326
6,826,238 B2 * 11/2004 Ahn ..................... 375/326
2002/0071502 A1 * 6/2002 Chan et al. ............ 375/326

OTHER PUBLICATIONS

Patent Abstracts of Japan, 2000-324192, Nov. 24, 2000.

* cited by examiner

Primary Examiner—Amanda T. Le
(74) Attorney, Agent, or Firm—Arent Fox PLLC

(57) ABSTRACT

A demodulating device capable of high-efficiency, high-accuracy phase noise correction control and improved in quality and reliability. A digital signal generating portion synchronously detects a modulated input signal and subjects the signal to A/D conversion to generate digital signals corresponding to phase axes. A timing recovery portion extracts symbol timing of the digital signals to recover timing. A carrier recovery portion sets a gain for a phase difference between the timing-recovered digital signals in accordance with a phase noise correction signal, and rotates symbols in a direction to suppress phase noise in accordance with an oscillation signal generated based on the gain, to recover carrier. A phase noise correction portion outputs the phase noise correction signal which takes a value equal to an increase of the phase difference when the phase difference has increased on the positive side, and which takes a value obtained by multiplying an increase of the phase difference by "−1" when the phase difference has increased on the negative side.

10 Claims, 16 Drawing Sheets

DEMODULATING DEVICE, BROADCASTING SYSTEM, AND SEMICONDUCTOR DEVICE

BACKGROUND OF THE INVENTION

1. Field of the Invention

The present invention relates to a demodulating device, a broadcasting system and a semiconductor device, and more particularly, to a demodulating device for demodulating a modulated signal, a broadcasting system for performing digital satellite broadcast communications, and a semiconductor device in which a circuit element for demodulating a modulated signal is integrated on an identical substrate.

2. Description of the Related Art

PSK (Phase Shift Keying) is known as one of digital modulation/demodulation techniques. PSK is a modulation technique in which phase is shifted as a parameter of carrier (carrier wave), and is widely used in the fields of satellite communications etc.

FIG. 16 shows a schematic configuration of a conventional PSK demodulator. The PSK demodulator 400 comprises a local oscillator 401, multipliers 402a and 402b, a π/2 phase shifter 403, a recovery section 404, and a phase noise correction section 405.

The local oscillator 401 generates a sinusoidal wave having the same frequency and phase as the carrier used on the transmitting side for modulation. The π/2 phase shifter 403 shifts, by π/2, the phase of the local oscillation signal generated by the local oscillator 401. The multiplier 402a obtains a product of the input signal and the local oscillation signal from the local oscillator 401. The multiplier 402b obtains a product of the input signal and the output of the π/2 phase shifter 403.

The recovery section 404 passes low-frequency components of the output signals from the multipliers 402a and 402b, then subjects the low-frequency components to A/D conversion to obtain digital signals corresponding to respective phase axes, and recovers the timing and the carrier, thereby demodulating the baseband signal.

Provided that the frequency component of the local oscillation signal generated by the local oscillator 401 is fL, the frequency component of the signal actually generated by the local oscillator 401 is fL±Δf, where Δf represents an unstable frequency part including frequency deviation, phase noise, etc.

Thus, the output of the local oscillator 401 includes an unstable frequency part (the oscillation frequency varies). Since the carrier is recovered using such a local oscillation signal, the baseband signal inevitably includes phase noise (phase jitter). If the phase noise is large, then the phase difference between I- and Q-channel signals correspondingly increases.

Accordingly, in cases where the phase noise is large, it is necessary that control be performed quickly following the phase noise in such a direction as to suppress the influence of the phase noise, so that a signal free from phase difference may be generated without delay. It is therefore essential that ordinary carrier recovery control be additionally provided with phase noise correction control, to bring symbols of the baseband signal to their normal symbol positions as quickly as possible.

As conventional phase noise correction control used in the illustrated PSK demodulator 400, first, a phase noise correction section 405 calculates a ratio of symbol variation in the phase direction to that in the amplitude direction, and generates a correction value based on the result of calculation. Then, based on the correction value thus generated by the phase noise correction section 405, the recovery section 404 rotates the phase of symbols, thereby suppressing the influence of the phase noise.

In the above conventional PSK demodulator 400, however, since the phase noise correction control is performed based on the ratio of symbol variation in the phase direction to that in the amplitude direction, the correction control is susceptible especially to noise that enters the radio signal via antenna, thus giving rise to a problem that the accuracy in the phase noise correction is low.

Further, in the conventional phase noise correction control, while a C/N (Carrier-to-Noise) ratio is low, a situation can arise where there is no spacing between adjacent symbols in the constellation showing the distribution of symbols. If this occurs, phase noise cannot be corrected at all, causing a lowering of the quality of radio communication control.

SUMMARY OF THE INVENTION

The present invention was created in view of the above circumstances, and an object thereof is to provide a demodulating device which is capable of high-efficiency, high-accuracy phase noise correction control and thus is improved in quality and reliability.

Another object of the present invention is to provide a broadcasting system which is capable of high-efficiency, high-accuracy phase noise correction control and thus is improved in quality and reliability.

Still another object of the present invention is to provide a semiconductor device which is capable of high-efficiency, high-accuracy phase noise correction control and thus is improved in quality and reliability.

To achieve the first object, there is provided a demodulating device for demodulating a modulated signal. The demodulating device comprises digital signal generating means for synchronously detecting a modulated input signal and then subjecting the input signal to A/D conversion to generate digital signals corresponding to respective phase axes, timing recovery means for extracting symbol timing of the digital signals to recover the timing, carrier recovery means for setting a gain for a phase difference between the timing-recovered digital signals in accordance with a phase noise correction signal, and rotating symbols in a direction to suppress phase noise in accordance with an oscillation signal generated based on the gain, to recover a carrier, and phase noise correction means for outputting the phase noise correction signal which takes a value equal to an increase of the phase difference when the phase difference has increased on a positive side, and which takes a value obtained by multiplying an increase of the phase difference by "−1" when the phase difference has increased on a negative side.

To achieve the second object, there is provided a broadcasting system for performing digital satellite broadcast communications. The broadcasting system comprises a broadcast transmitting device and a broadcast receiving device. The broadcast transmitting device includes modulating means for modulating a signal to be transmitted thereby to generate a modulated signal, an up-converter for converting the modulated signal to a radio signal, and transmitting means for transmitting the radio signal from an antenna to a satellite. The broadcast receiving device including receiving means for receiving a signal transmitted from the satellite toward ground, a down-converter for subjecting the received signal to frequency conversion thereby to generate a signal to be demodulated, digital signal generating means for synchronously detecting the signal which is output from the down-converter and which has been modulated on a transmitting side, and then subjecting the signal to A/D conversion to generate digital signals corresponding to respective phase axes, timing recovery means for extracting symbol timing of the digital signals to recover the timing, carrier recovery means for setting a gain for a phase difference between the timing-recovered digital signals in accordance with a phase noise correction signal, and rotating symbols in a direction to suppress phase noise in accordance with an oscillation signal generated based on the gain, to recover a carrier, and phase noise correction means for outputting the phase noise correction signal which takes a value equal to an increase of the phase difference when the phase difference has increased on a positive side, and which takes a value obtained by multiplying an increase of the phase difference by "−1" when the phase difference has increased on a negative side.

Also, to achieve the third object, there is provided a semiconductor device in which a circuit element for demodulating a modulated signal is integrated on an identical substrate. The semiconductor device comprises digital signal generating means for synchronously detecting a modulated input signal and then subjecting the input signal to A/D conversion to generate digital signals corresponding to respective phase axes, timing recovery means for extracting symbol timing of the digital signals to recover the timing, carrier recovery means for setting a gain for a phase difference between the timing-recovered digital signals in accordance with a phase noise correction signal, and rotating symbols in a direction to suppress phase noise in accordance with an oscillation signal generated based on the gain, to recover a carrier, and phase noise correction means for outputting the phase noise correction signal which takes a value equal to an increase of the phase difference when the phase difference has increased on a positive side, and which takes a value obtained by multiplying an increase of the phase difference by "−1" when the phase difference has increased on a negative side.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
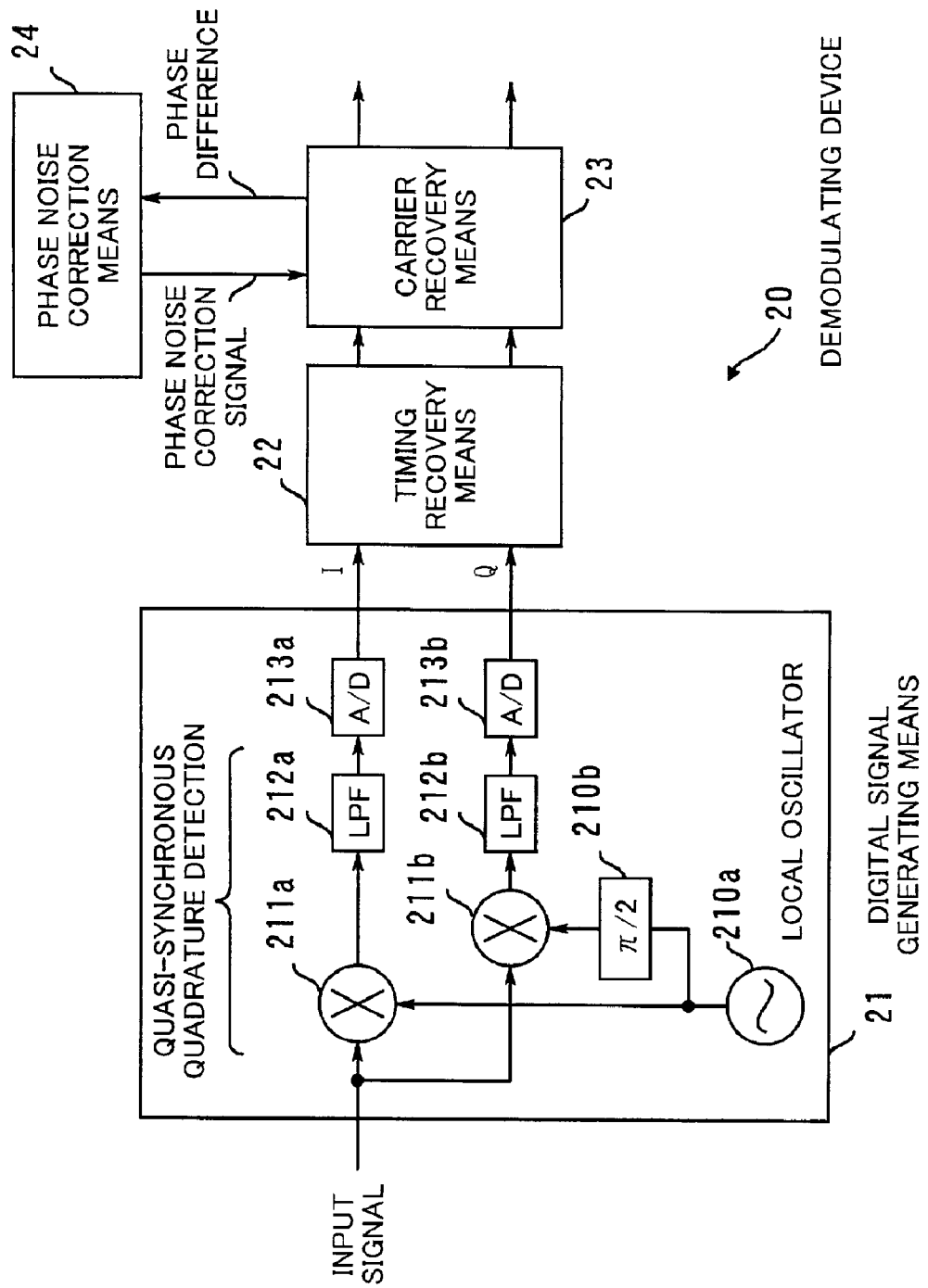
FIG. 1 is a diagram illustrating the principle of a demodulating device according to the present invention.

Embodiments of the present invention will be hereinafter described with reference to the drawings. FIG. 1 illustrates the principle of a demodulating device according to the present invention. The demodulating device 20 demodulates a modulated signal, which is assumed, in the following description, to be an n-phase PSK modulated signal.

Digital signal generating means 21 comprises a local oscillator 210a, a π/2 phase shifter 210b, multipliers 211a and 211b, LPFs (Low-Pass Filters) 212a and 212b, and A/D (Analog/Digital) converters 213a and 213b.

The local oscillator 210a generates a sinusoidal wave having the same frequency and phase as a carrier used on a transmitting side for modulation. The π/2 phase shifter 210b shifts the local oscillation signal from the local oscillator 210a by π/2. The multiplier 211a obtains a product of an input signal and the local oscillation signal from the local oscillator 210a. The multiplier 211b obtains a product of the input signal and an output from the π/2 phase shifter 210b.

The LPFs 212a and 212b pass low-frequency components of output signals from the respective multipliers 211a and 211b. The A/D converters 213a and 213b subject the outputs from the respective LPFs 212a and 212b to A/D conversion, to obtain digital signals corresponding to I and Q phase axes, respectively. In this manner, the digital signal generating means 21 performs quasi-synchronous quadrature detection of the n-phase PSK modulated signal and generates digitized signals of I- and Q-axis channels.

Timing recovery means 22 extracts symbol timing of the digital signals for the purpose of timing recovery. Based on the extracted timing, carrier recovery means 23 extracts a baseband signal from the modulated signal.

According to the present invention, the carrier recovery means 23 sets a gain for a phase difference between the timing-recovered digital signals in accordance with a phase noise correction signal supplied from phase noise correction means 24. Then, in accordance with an oscillation signal generated based on the gain, symbols are rotated in a direction to suppress phase noise (phase jitter), thereby to recover the carrier. The internal configuration of the carrier recovery means 23 will be described later with reference to FIG. 5.

When the phase difference between the I- and Q-axis signals has increased on the positive side, the phase noise correction signal output from the phase noise correction means 24 takes a value equal to the increase of the phase difference, and when the phase difference has increased on the negative side, the phase noise correction signal takes a value obtained by multiplying the increase of the phase difference by "−1". The phase noise correction control will be described in detail later with reference to FIG. 6 and the following figures.

Figure 2:
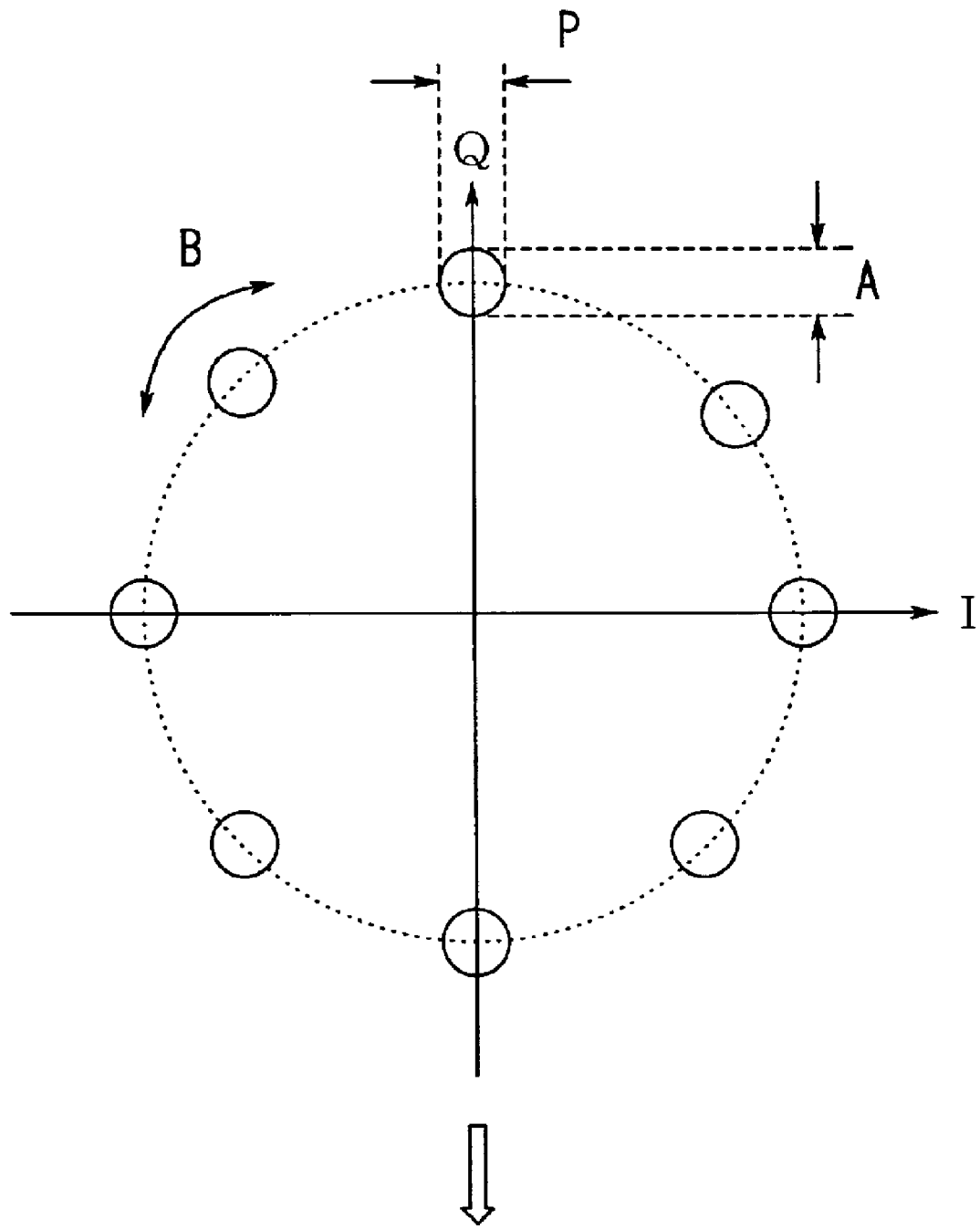
FIG. 2 is a diagram showing an 8PSK constellation observed when a C/N ratio is high and there is no phase noise.

A problem which the present invention is to solve will be now explained in detail, taking 8PSK as an example. FIG. 2 shows an 8PSK constellation observed when the C/N ratio is high and there is no phase noise, wherein the horizontal and vertical axes indicate I and Q axes, respectively.

Where phase noise is included, symbols are varied in either of phase directions indicated by double-headed arrow B in the figure. According to conventional techniques, the ratio of P to A, namely, P/A, is calculated, where P represents symbol variation in the phase direction and A represents symbol variation in the amplitude direction, and the calculation result is compared with a threshold set in advance. A correction value is then generated in accordance with the magnitude of the difference between the calculated ratio and the threshold. In the figure, P/A=1, showing an ideal state including no phase noise.

Figure 3:
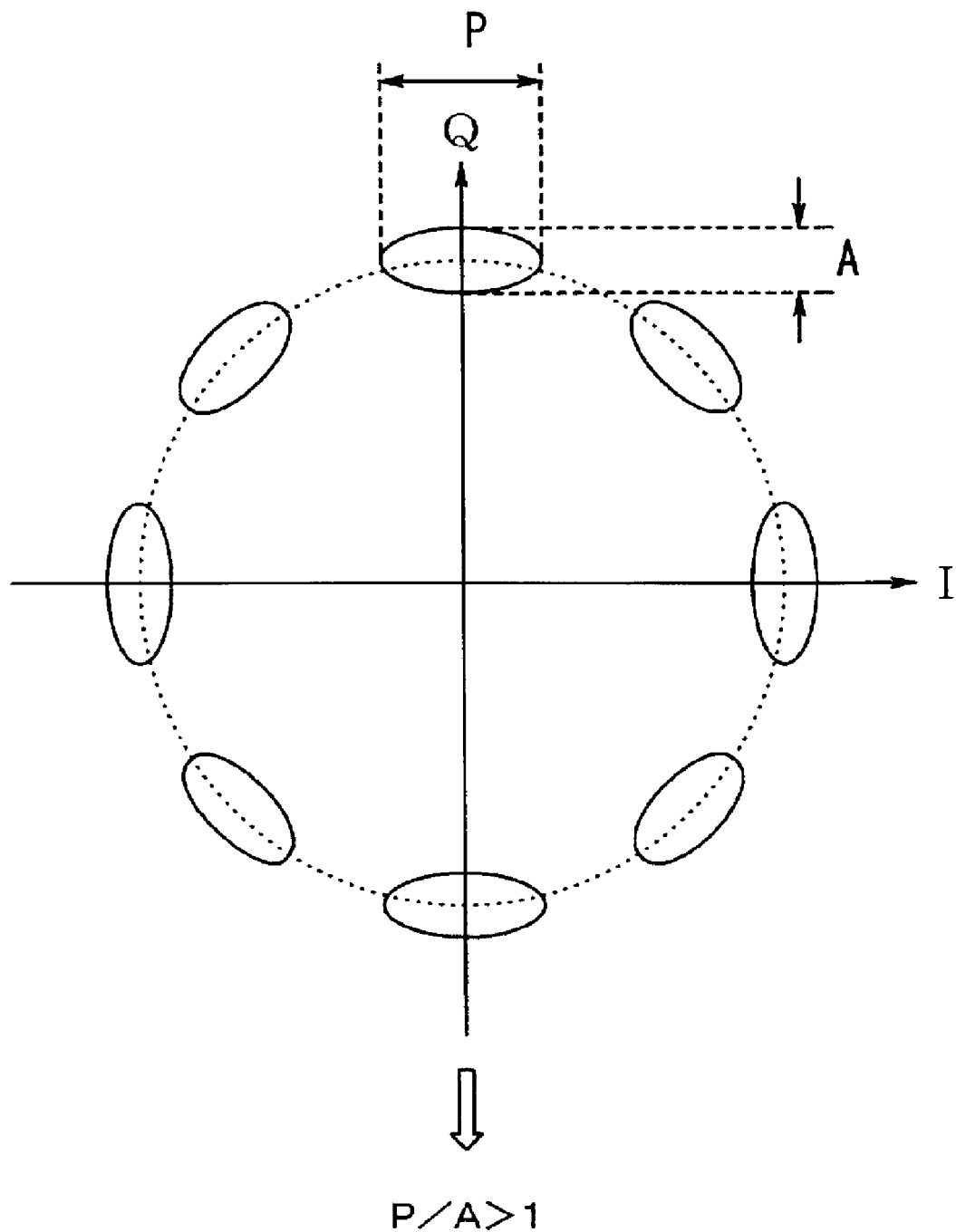
FIG. 3 is a diagram showing an 8PSK constellation observed when the C/N ratio is high and there is phase noise included.

FIG. 3 shows an 8PSK constellation observed when the C/N ratio is high and there is phase noise included. In cases where the C/N ratio is high and also phase noise is included, symbols vary in the phase directions, and thus can be plotted as ellipses expanded in the phase directions. In such cases, P/A>1, and the phase noise can possibly exert a significant influence.

Figure 4:
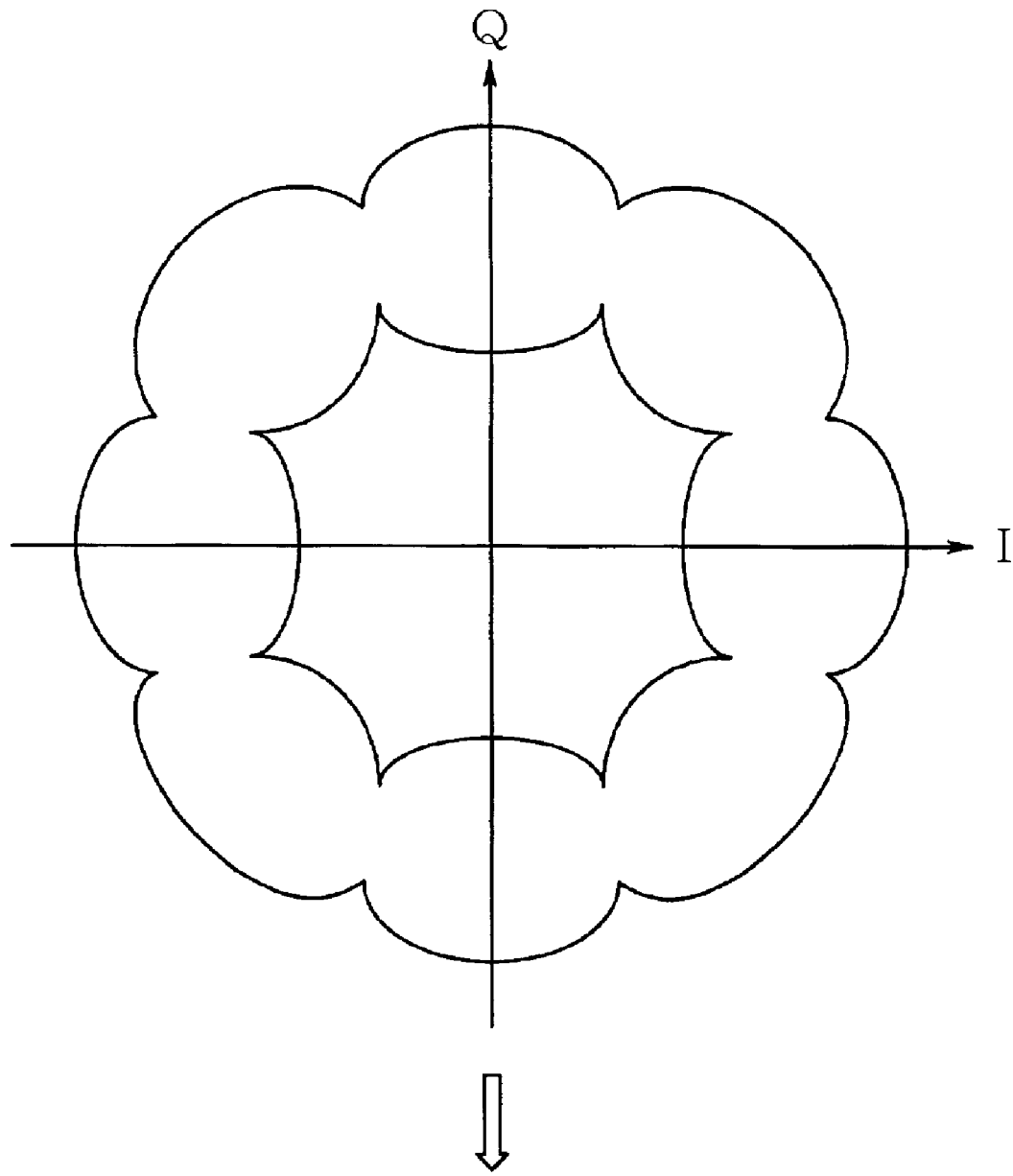
FIG. 4 is a diagram showing an 8PSK constellation observed when the C/N ratio is low and there is phase noise included.

FIG. 4 shows an 8PSK constellation observed when the C/N ratio is low and also phase noise is included. Where the C/N ratio is low and also phase noise is included, a situation can possibly arise where there is no spacing between adjacent symbols, and if this occurs, the width of P is undetectable, as seen from the figure. Consequently, with the conventional techniques, it is not possible to correct the phase noise.

Thus, the conventional techniques are capable of phase noise correction only when the C/N ratio is high, and cannot maintain the accuracy of phase noise correction control when affected by noise included in the signal (Especially in cases where the C/N ratio lowers to an extent such that there is no spacing between adjacent symbols, the correction itself is unfeasible). The demodulating device 20 according to the present invention can efficiently correct phase noise even under the influence of noise, thereby improving the quality of demodulation control.

Figure 5:
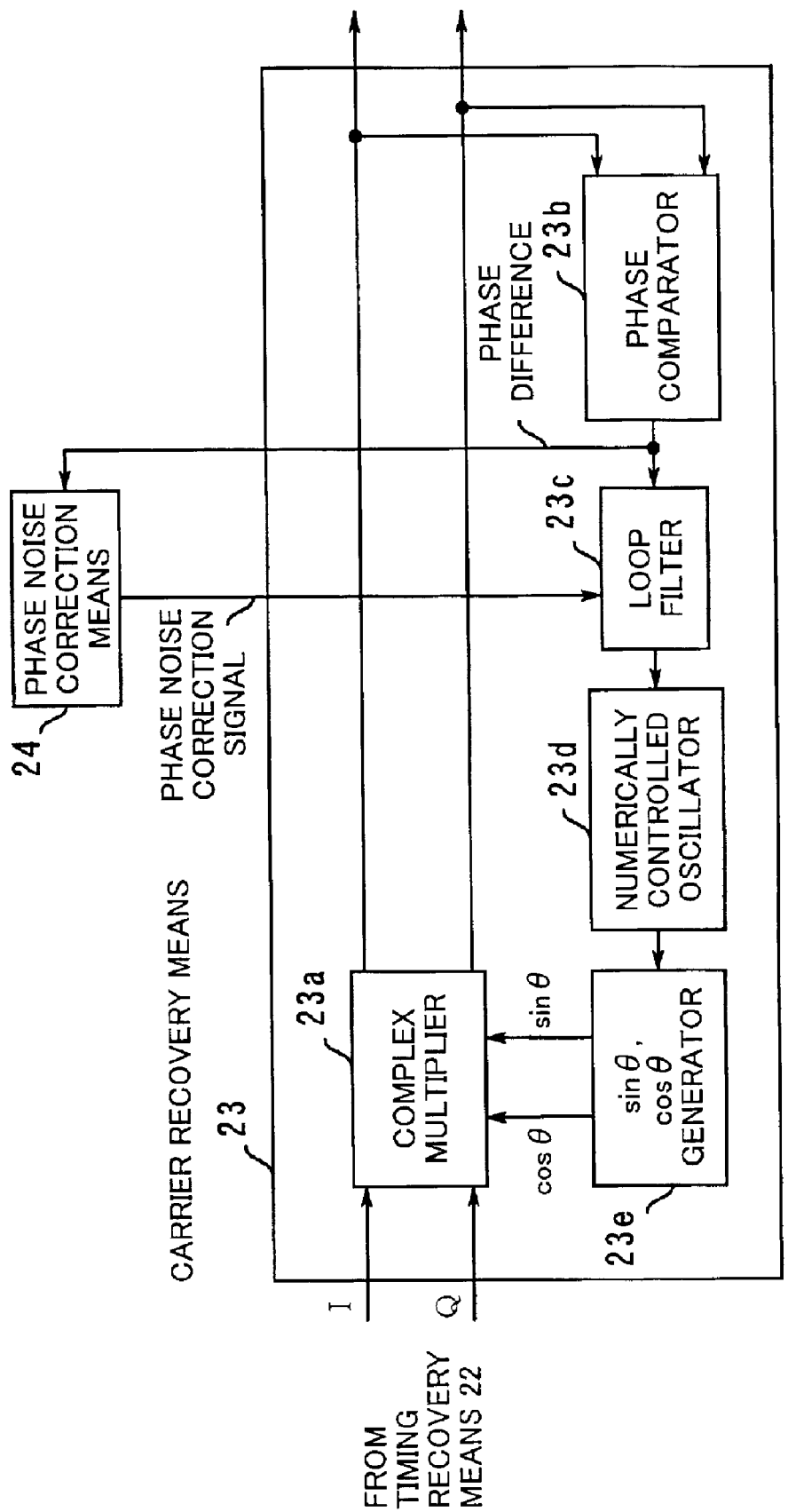
FIG. 5 is a diagram showing the internal configuration of carrier recovery means and the connection between the carrier recovery means and phase noise correction means.

The configuration of the carrier recovery means 23 will be now described. FIG. 5 shows the internal configuration of the carrier recovery means 23 as well as the connection between the carrier recovery means 23 and the phase noise correction means 24. The carrier recovery means 23 comprises a complex multiplier 23a, a phase comparator 23b, a loop filter 23c, a numerically controlled oscillator 23d, and a function generator (hereinafter referred to as sin θ, cos θ generator) 23e.

The phase noise correction means 24 is supplied with a phase difference, which is the output of the phase comparator 23b, and outputs the phase noise correction signal to the loop filter 23c.

The complex multiplier 23a performs complex multiplication by using the I- and Q-channel signals output from the timing recovery means 22 and function values (sin θ and cos θ) output from the sin θ, cos θ generator 23e, and rotates symbols by θ [rad] to obtain a baseband signal.

The phase comparator 23b compares the phases of the I- and Q-channel digital signals output from the complex multiplier 23a, to detect a phase difference therebetween. The loop filter 23c smoothes the phase difference output from the phase comparator 23b and outputs the result with a gain added based on the phase noise correction signal.

The numerically controlled oscillator 23d has a function similar to that of a VCO (Voltage Controlled Oscillator) and oscillates in accordance with the level of the input signal. Specifically, the numerically controlled oscillator 23d outputs an oscillation signal in accordance with the gain output from the loop filter 23c. The sin θ, cos θ generator 23e generates values of sin θ and cos θ in accordance with the value of the oscillation signal.

Figure 6:
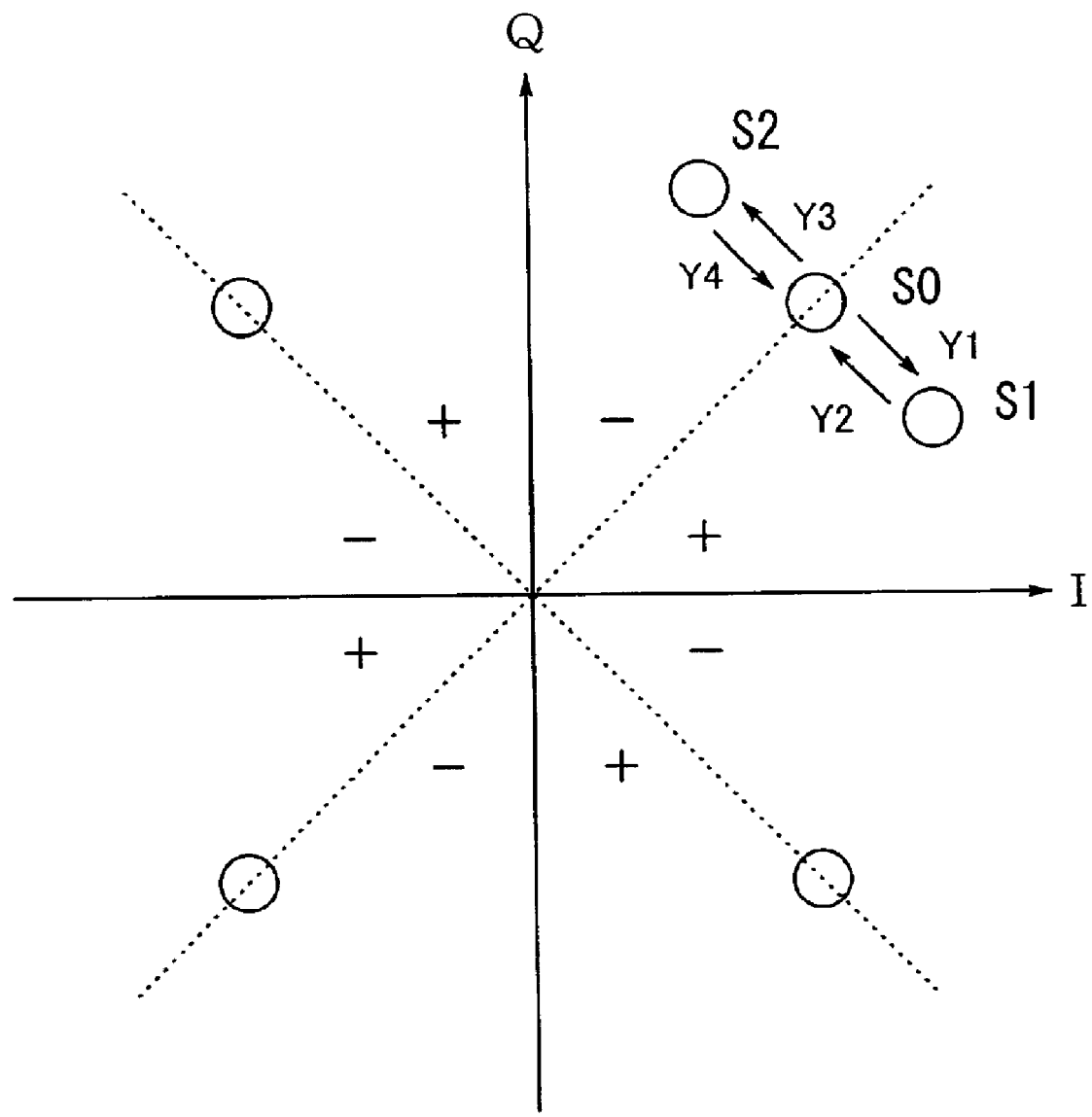
FIG. 6 is a diagram illustrating the relationship between phase noise and phase difference.
Figure 7:
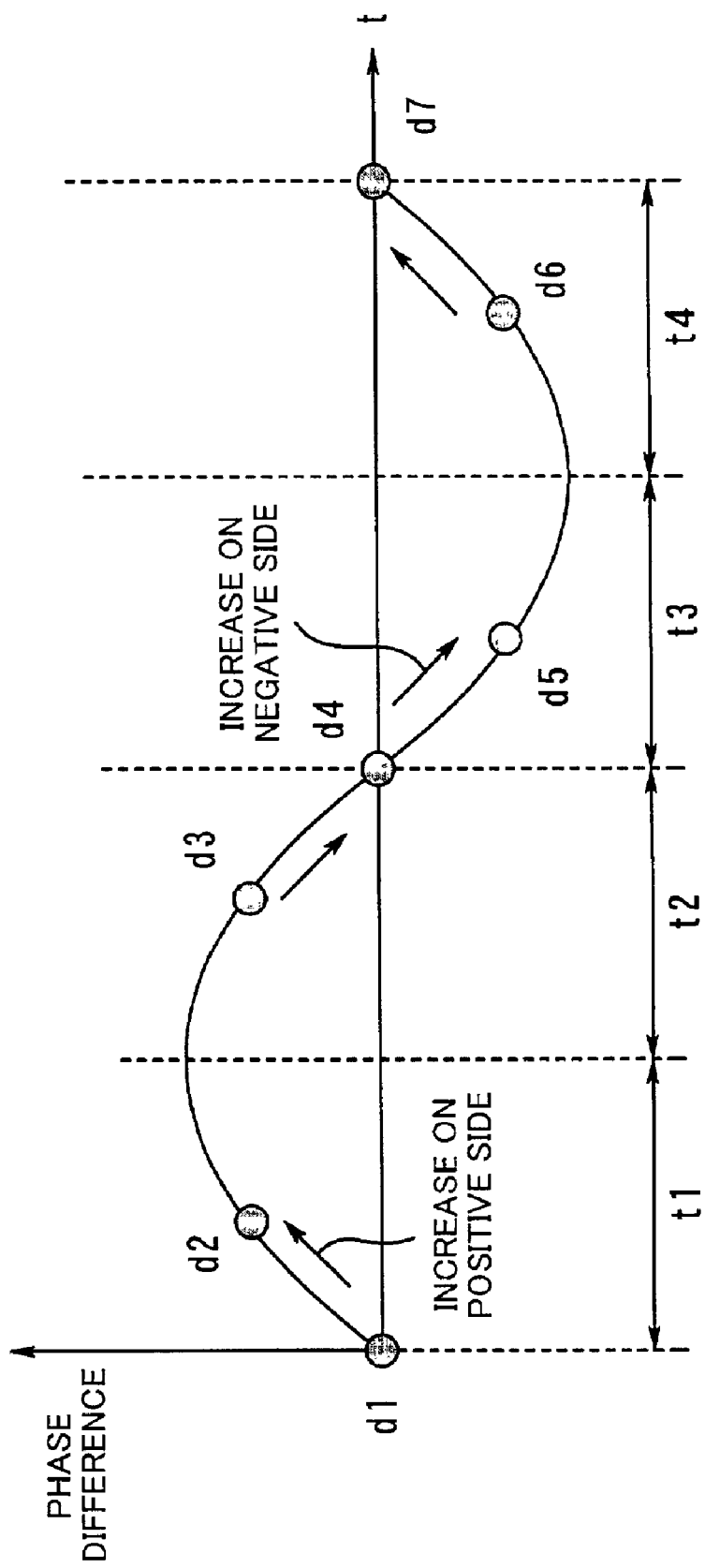
FIG. 7 is a diagram also illustrating the relationship between phase noise and phase difference.

The phase noise correction control according to the present invention will be now described in detail. FIGS. 6 and 7 illustrate the relationship between phase noise and phase difference. FIG. 6 shows a constellation (QPSK is considered by way of example), wherein plus and minus polarities are set as illustrated. FIG. 7 shows the output (phase difference) from the phase comparator 23b, wherein the vertical axis indicates the phase difference and the horizontal axis indicates time.

Let us consider a case where, on the constellation shown in FIG. 6, symbol S0 is first located at the normal position, but with increase in phase noise toward the plus polarity, the symbol shifts to S1 in the next period (arrow Y1). This change corresponds, in the phase difference waveform shown in FIG. 7, to a change of phase difference on the positive side from point d1 with a zero phase difference to point d2. Where the symbol at S1 shifts in the next period to S0 (i.e., returns to the normal position; arrow Y2) on the constellation of FIG. 6, this change corresponds, in the phase difference waveform of FIG. 7, to a change of phase difference from point d3 to point d4.

Also, let us consider a case where, on the constellation shown in FIG. 6, symbol S0 is located at the normal position, but with increase in phase noise toward the minus polarity, the symbol shifts to S2 in the next period (arrow Y3). This change corresponds, in the phase difference waveform shown in FIG. 7, to a change of phase difference on the negative side from point d4 with a zero phase difference to point d5. Where the symbol at S2 shifts in the next period to S0 (i.e., returns to the normal position; arrow Y4) on the constellation of FIG. 6, this change corresponds, in the phase difference waveform of FIG. 7, to a change of phase difference from point d6 to point d7.

In this manner, as the phase noise increases on the positive side, the phase difference also increases on the positive side. Similarly, as the phase noise increases on the negative side, the phase difference also increases on the negative side. Also, the magnitude of the phase noise is proportional to that of the phase difference.

According to the present invention, therefore, the phase noise correction means 24 uses, as phase noise information, the phase difference output from the phase comparator 23b, and sets a correction value based on the phase difference, the correction value being output as the phase noise correction signal. Specifically, where the phase difference has increased on the positive side, a value equal to the increase of the phase difference is output as the phase noise correction signal, and where the phase difference has increased on the negative side, a value obtained by multiplying the increase of the phase difference by "−1" is output as the phase noise correction signal.

Figure 8:
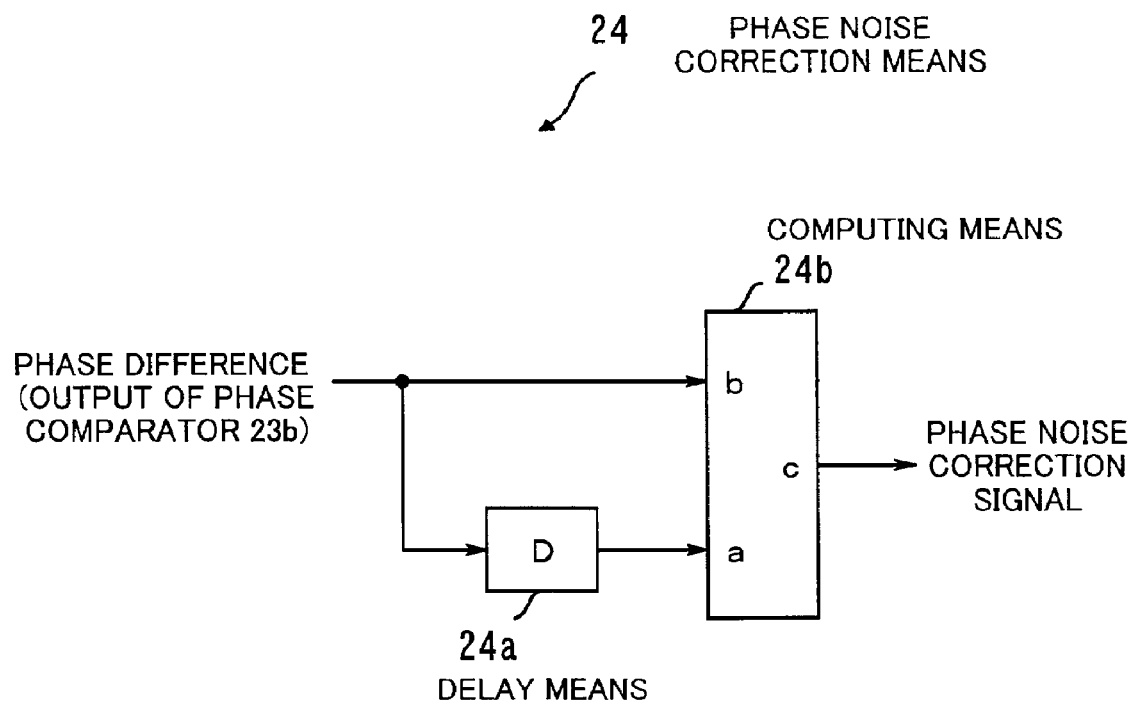
FIG. 8 is a diagram showing the configuration of the phase noise correction means.

FIG. 8 shows the configuration of the phase noise correction means 24. The phase noise correction means 24 comprises delay means 24a and computing means 24b (first embodiment).

The delay means 24a delays the phase difference by one symbol. Provided the phase difference delayed by one symbol is a and the current phase difference is b, the computing means 24b performs computation using the phase differences a and b, as indicated by equations below, and outputs the phase noise correction signal c.

If $a>0$ and also if $b-a>0$, $c=b-a$ (>0)  (1a)

If $a<0$ and also if $b-a<0$, $c=b-a$ (<0)  (1b)

If the phase differences do not meet either of the conditions associated with equations (1a) and (1b), c=0.

Equation (1a) applies to interval t1 shown in FIG. 7, equation (1b) applies to interval t3, and the equation c=0 applies to intervals t2 and t4. Namely, in the case where the phase difference increases on the positive or negative side, a value equal to the increase is output as the phase noise correction signal, and where the phase difference decreases (in intervals in which the phase difference returns to normal position), as in the intervals t2 and t4, no phase noise correction signal is output.

Figure 9:
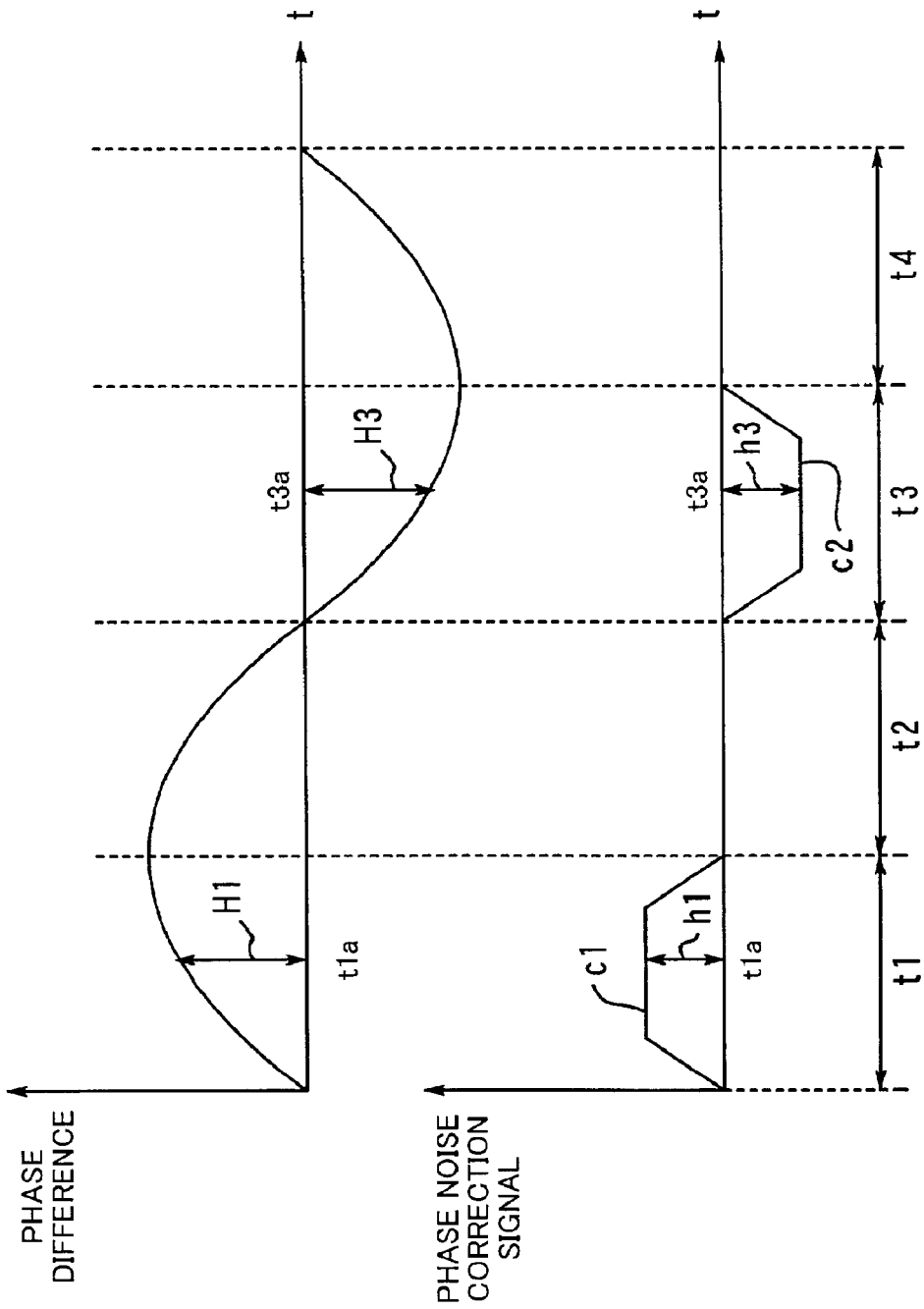
FIG. 9 is a diagram showing the relationship between phase difference and phase noise correction signal.

FIG. 9 shows the relationship between the phase difference and the phase noise correction signal. In the interval t1, the phase noise correction means 24 generates a positive-level phase noise correction signal c1, and in the interval t3, the phase noise correction means 24 generates a negative-level phase noise correction signal c2.

Let us consider the operation of the phase noise correction means 24 and of the carrier recovery means 23 at time t1a, for example. At time t1a, the phase comparator 23b outputs a level H1 as the phase difference. The phase noise correction means 24 outputs the phase noise correction signal c1 with a level h1.

The loop filter 23c adds together the value of the phase noise correction signal and the phase difference, and outputs a gain (H1+h1). Consequently, the numerically controlled oscillator 23d, which receives the gain (H1+h1) as the input signal, generates an oscillation signal corresponding to the input level.

Subsequently, the sin θ, cos θ generator 23e generates sin θ and cos θ based on the oscillation signal, and the complex multiplier 23a performs complex multiplication by using the I- and Q-channel signals and the values of sin θ and cos θ, and rotates symbols by θ [rad]. (The complex multiplier 23a operates in a manner such that, if the output of the loop filter 23c shows a positive gain, symbols are rotated by θ in the direction of the arrow Y2 shown in FIG. 6. Also, the greater the positive gain from the loop filter 23c, the quicker the symbols are rotated by θ in the direction of the arrow Y2.)

Thus, in the case where the phase difference is increasing on the positive side at time t1a, the carrier is recovered based on the oscillation signal which is generated by the numerically controlled oscillator 23d in accordance with a signal corresponding to the sum of the phase difference level H1 and the level h1 of the phase noise correction signal c1. Consequently, symbols displaced toward the plus polarity can be immediately returned to their normal symbol position.

According to the present invention, control is performed such that the greater the phase difference, the quicker the symbols are rotated in a direction to eliminate the phase difference (namely, follow-up performance is improved), whereby the symbol at S1 shown in FIG. 6, for example, immediately returns to the position S0.

The foregoing applies to the case where the phase difference increases on the negative side. At time t3a, for example, the phase comparator 23b outputs a phase difference level −H3, and the phase noise correction means 24 outputs the phase noise correction signal c2 having a value −h3.

The loop filter 23c adds together the value of the phase noise correction signal and the phase difference, and outputs a gain −(H3+h3). Subsequently, in the same manner as explained above, the carrier is recovered based on the oscillation signal which is generated by the numerically controlled oscillator 23d in accordance with the signal with the level −(H3+h3). (The complex multiplier 23a operates in a manner such that, if the output of the loop filter 23c shows a negative gain, symbols are rotated by θ in the direction of the arrow Y4 shown in FIG. 6. Also, the greater the negative gain from the loop filter 23c, the quicker the symbols are rotated by θ in the direction of the arrow Y4.) Consequently, symbols displaced toward the minus polarity can be immediately returned to their normal symbol position (the symbol at S2 shown in FIG. 6, for example, immediately returns to the position S0).

In the foregoing description, the loop filter 23c sets the gain by adding together the value of the phase noise correction signal and the value of the phase difference (first gain setting). Alternatively, the loop filter 23c may be designed to autonomously set the gain in accordance with the value of the phase noise correction signal (second gain setting). (For example, when supplied with the phase noise correction signal, the loop filter 23c outputs a gain obtained by internal control thereof by doubling the value of the received signal.)

Figure 10:
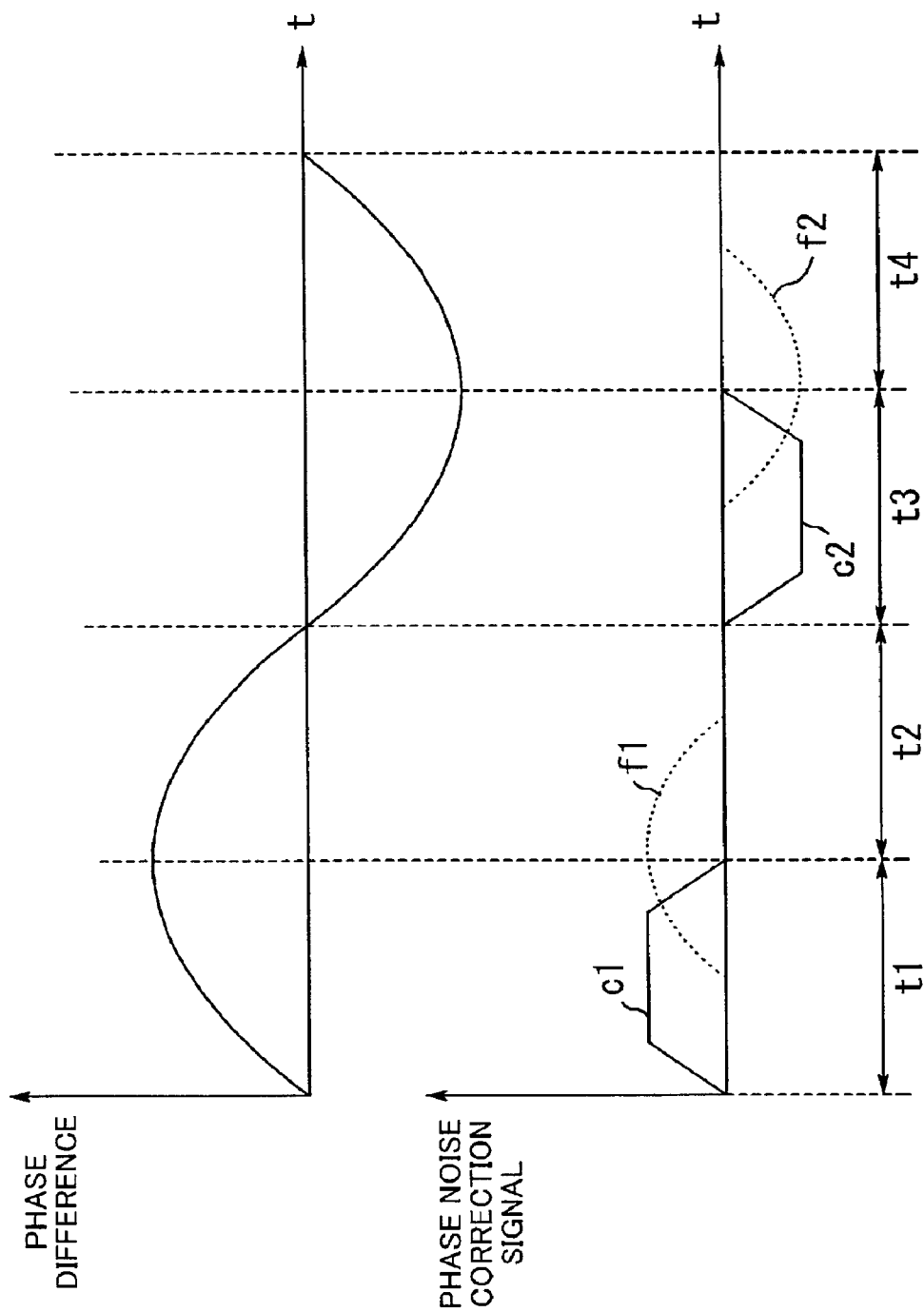
FIG. 10 is a diagram illustrating phase lag of an output signal from a loop filter.

Phase lag of the output signal of the loop filter 23c will be now described. FIG. 10 illustrates a phase lag of the output signal from the loop filter 23c. The signal input to the loop filter 23c is output with a phase lag caused due to the phase characteristic of the loop filter 23c.

Let it be assumed here that a filter output signal which is output from the loop filter 23c when supplied with a phase difference increasing on the positive side as well as with the phase noise correction signal c1 is f1, and that a filter output signal which is output from the loop filter 23c when supplied with a phase difference increasing on the negative side as well as with the phase noise correction signal c2 is f2.

According to the present invention, the phase noise correction signal c1, c2 corresponding to the increase of the phase difference is output only during the interval t1, t3. Consequently, even in cases where the phase of the filter output signal f1, f2 significantly lags, as indicated by the dotted waveforms in the figure, with respect to the phase noise correction signal c1, c2, the filter output signal f1, f2 can maintain the same polarity as the phase difference.

Figure 11:
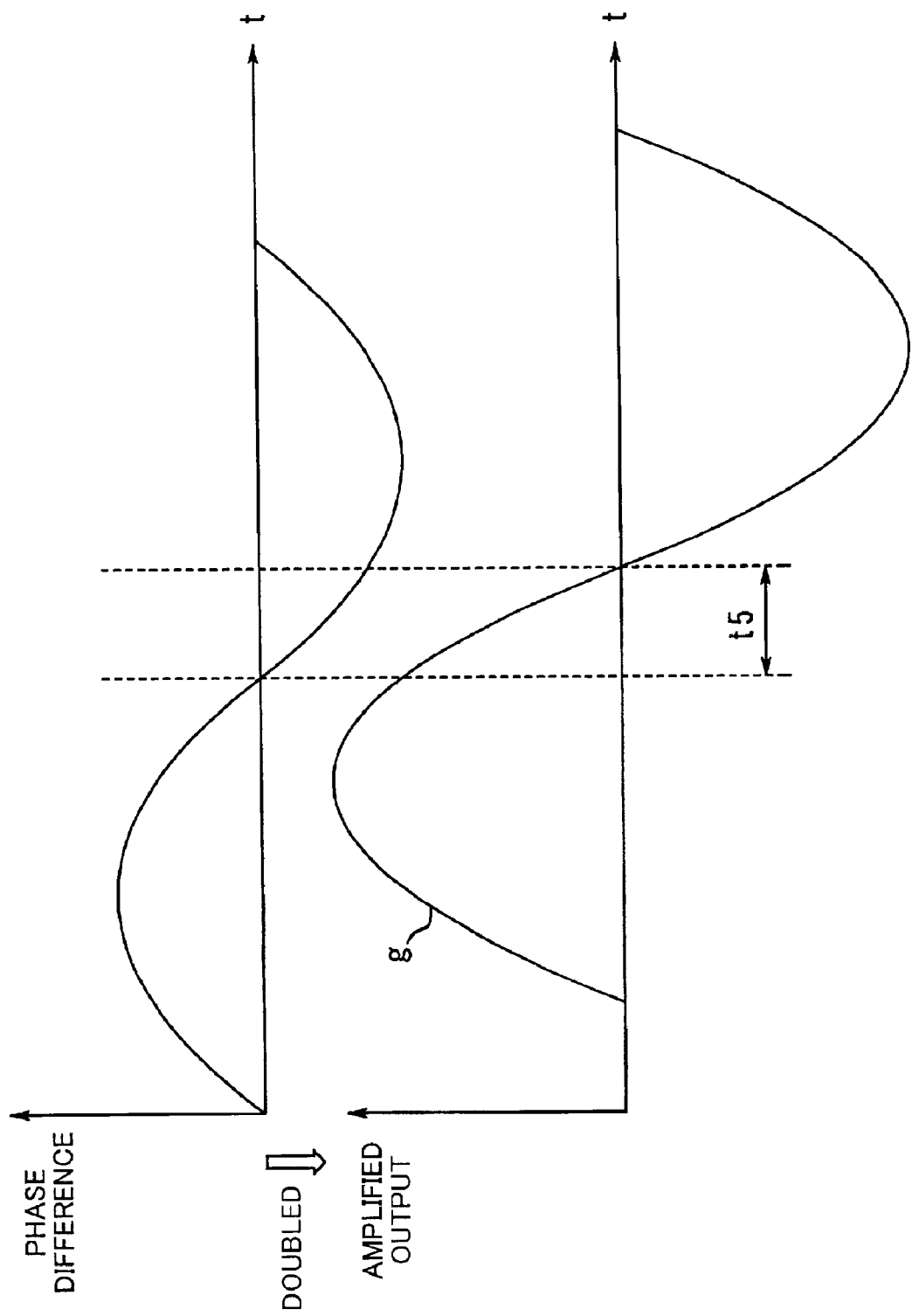
FIG. 11 is a diagram illustrating a problem arising from phase lag.

FIG. 11 illustrates a problem caused when a phase lag has occurred. It is assumed here that an amplifying section is arranged in the output stage of the phase comparator 23b to add a gain to the phase difference output from the phase comparator 23b, with a view to obtaining an effect similar to that achieved by the present invention.

In the case where the output from the phase comparator 23b is doubled in the amplifying section and the resulting signal g is input to the loop filter 23c, followed by the same control as described above, the phase of the output signal of the amplifying section lags with respect to the input phase difference due to the phase characteristic of the amplifying section.

If the phase of the signal g significantly lags with respect to the input phase difference, as shown in the figure, a situation where the phase difference and the signal g have opposite polarities arises during interval t5. If this occurs, a disadvantage is caused in the interval t5 that symbols are rotated in a direction opposite to that in which the symbols return to the normal position.

According to the present invention, by contrast, only when the phase difference is increasing on the positive or negative side, the output gain of the loop filter 23c is raised to carry out the phase noise correction control, thereby improving the response of the complex multiplier 23a. Consequently, even in cases where the output phase of the loop filter 23c significantly lags, polarity coincidence can be maintained, as described above with reference to FIG. 10, thus permitting improvement of accuracy.

Figure 12:
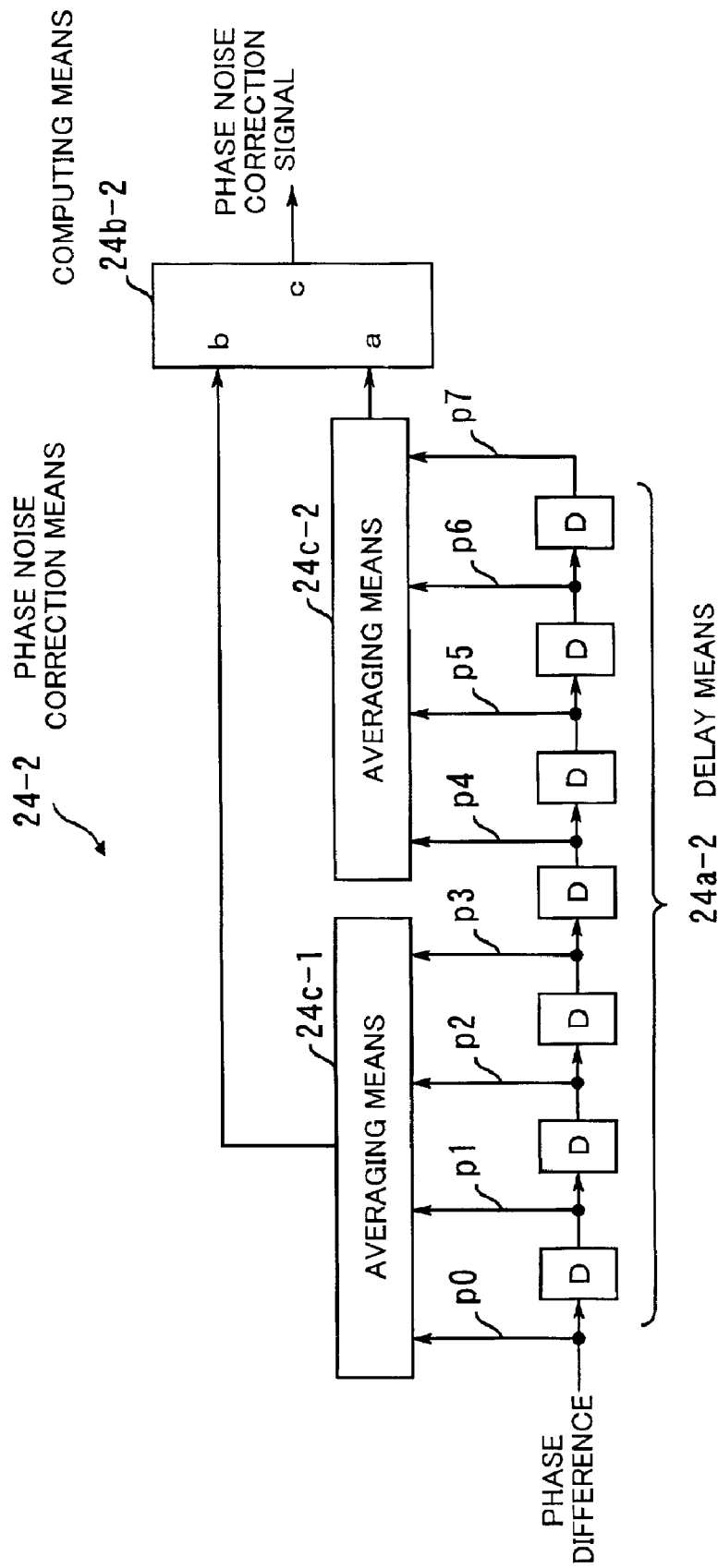
FIG. 12 is a diagram showing the configuration of phase noise correction means according to a second embodiment.

A second embodiment of the present invention will be now described. FIG. 12 shows the configuration of phase noise correction means according to the second embodiment. The phase noise correction means 24-2 of the second embodiment generates a phase noise correction signal based on average values of phase differences and comprises delay means 24a-2, computing means 24b-2, and averaging means 24c-1 and 24c-2.

In the illustrated example, the delay means 24a-2 has seven stages of delay blocks each for delaying the phase difference by one symbol. The averaging means 24c-1 obtains an average value of an input phase difference p0 and phase differences p1 to p3 respectively delayed by the first- to third-stage delay blocks. The averaging means 24c-2 obtains an average value of phase differences p4 to p7 respectively delayed by the fourth- to seventh-stage delay blocks.

Provided the average value of phase differences from the one which is n symbols before the current phase difference to the one which is m (n>m) symbols before the current phase difference is a and the average value of phase differences from the one which is m-1 symbols before the current phase difference to the current phase difference is b, the computing means 24b-2 performs computation using the average phase differences a and b, as indicated by equations below, and outputs the phase noise correction signal c (in the illustrated example, n=7, m=4, a is the output of the averaging means 24c-2, and b is the output of the averaging means 24c-1).

If $a>0$ and also if $b-a>0$, $c=b-a$ (>0)                          (2a)

If $a<0$ and also if $b-a<0$, $c=b-a$ (<0)                          (2b)

If the average values do not meet either of the conditions associated with equations (2a) and (2b), c=0.

Thus, when the average values of phase differences show an increase on the positive side, the phase noise correction means 24-2 outputs a value equal to the increase, and when the average values show an increase on the negative side, the phase noise correction means 24-2 outputs a value obtained by multiplying the increase by "-1".

By using the average values of phase differences, it is possible to detect the degree of increase in the phase difference output from the phase comparator 23b even in cases where the C/N ratio lowers to an extent such that there is no spacing between adjacent symbols.

Namely, in the second embodiment, the I- and Q-channel signals including noise are input to the phase comparator 23b, and the phase difference generated based on these signals is subjected to the phase difference averaging process, whereby the influence of the noise can be lessened to a certain degree (even if the C/N ratio lowers to an extent such that there is no spacing between adjacent symbols, the degree of increase in the phase difference can be detected satisfactorily by the averaging process). Although in the above example, four symbols are used for the calculation of each average value, the number of symbols may be increased, in which case even a lower C/N ratio can be coped with.

Figure 13:
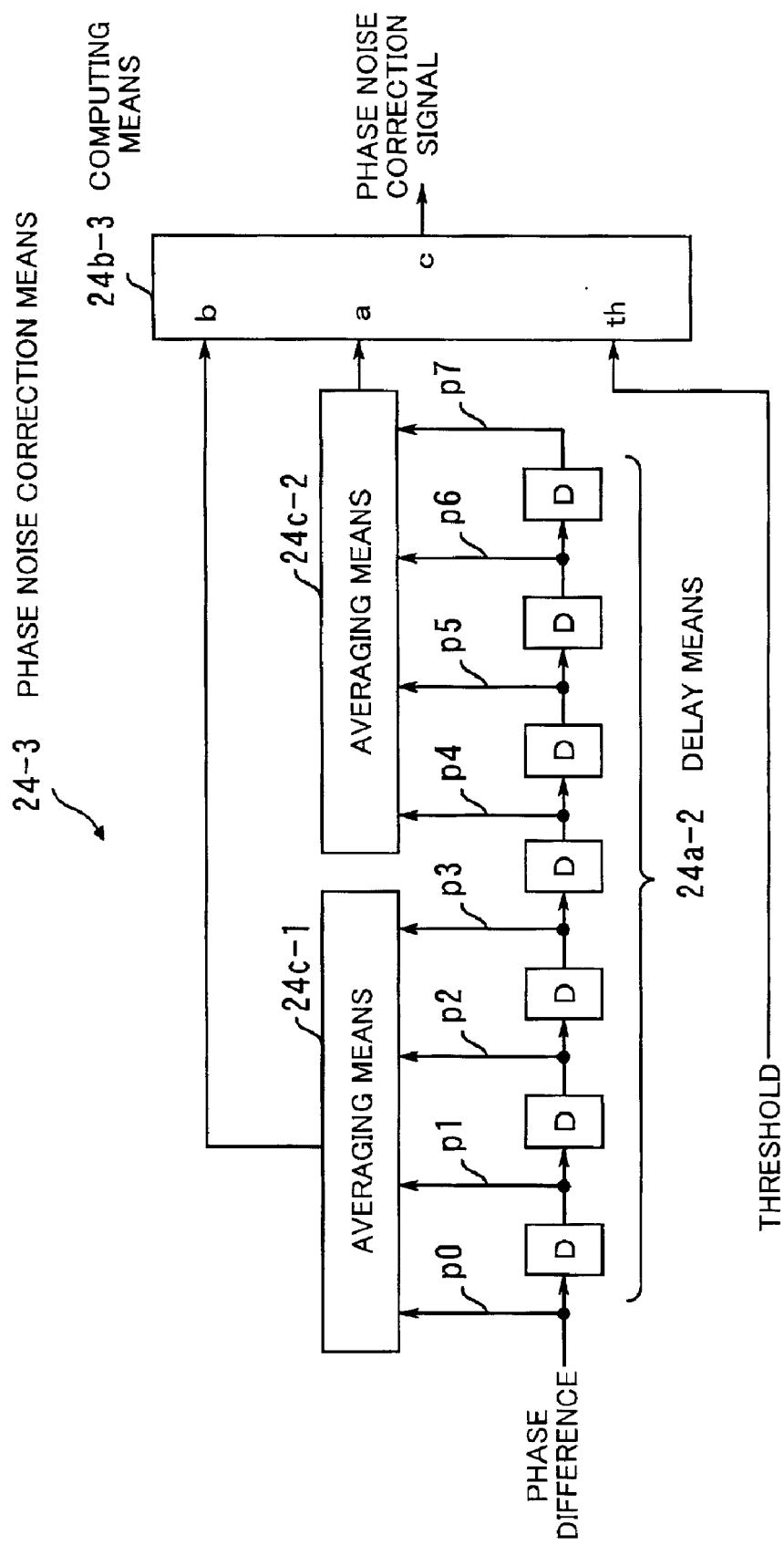
FIG. 13 is a diagram showing the configuration of phase noise correction means according to a third embodiment.

A third embodiment will be now described. FIG. 13 shows the configuration of phase noise correction means according to the third embodiment. The phase noise correction means 24-3 of the third embodiment generates a phase noise correction signal by using average values of phase differences and a preset threshold, and to this end, the threshold is input to an input section of computing means 24b-3. In other respects, the configuration is identical with that shown in FIG. 12.

Provided that the threshold is th, the computing means 24b-3 performs computation using the average phase differences a and b, as indicated by equations below, and outputs the phase noise correction signal c.

If $a>0$ and also if $b-a>th$, $c=b-a$ (>0)                          (3a)

If $a<0$ and also if $b-a<th$, $c=b-a$ (<0)                          (3b)

If the average phase differences do not meet either of the conditions associated with equations (3a) and (3b), c=0.

Thus, by determining the increase of the phase difference in comparison with the threshold, it is possible to prevent erroneous operation from being caused by a slight increase/decrease in the phase difference that occurs due to noise included in the signal. Namely, in the first and second embodiments, the conditions b−a>0 and b−a<0 are used to detect an increase of the phase difference in the positive and negative directions, and accordingly, even a very small change is regarded as an increase of the phase difference. Such a very small change can, however, be possibly caused by noise included in the signal, and not by the phase noise.

In the third embodiment, therefore, the conditions b−a>th and b−a<th are used, and only when change in the phase difference is greater than the fixed value, it is judged that phase noise is present. This makes the phase noise correction control more flexible, permitting improvement in accuracy.

Figure 14:
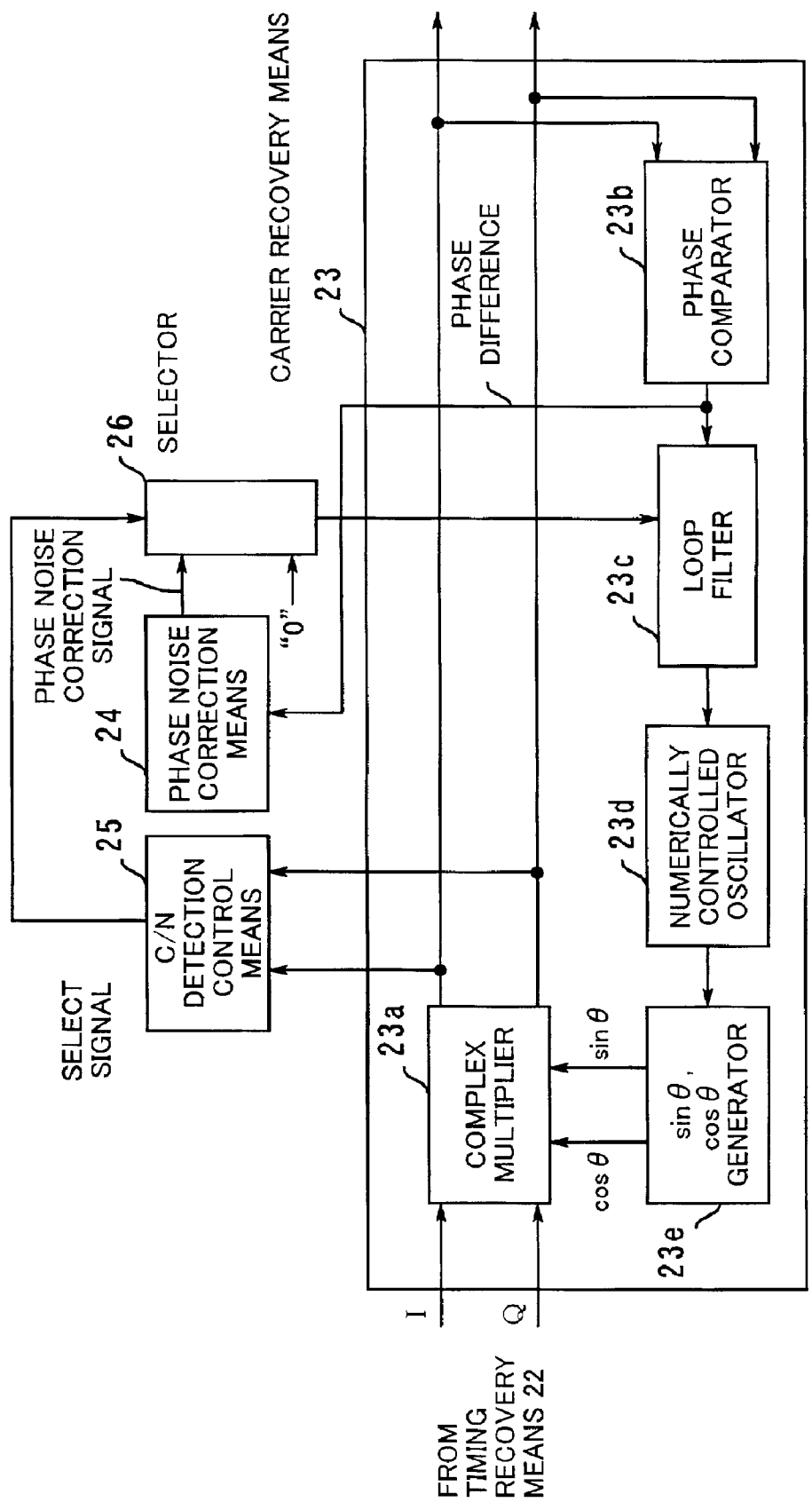
FIG. 14 is a diagram showing the configuration of a fourth embodiment.

A fourth embodiment will be now described. FIG. 14 shows the configuration of the fourth embodiment. In the fourth embodiment, C/N detection control means 25 is provided to control the output of the phase noise correction signal in accordance with the C/N value.

The C/N detection control means 25 detects a C/N value from the outputs of the complex multiplier 23a. In accordance with a select signal from the C/N detection control means 25, a selector 26 selects either the phase noise correction signal or a "0" output, which is then supplied to the loop filter 23c.

The C/N detection control means 25 outputs the select signal such that, when the detected C/N value is smaller than a preset C/N value, "0" is selected by the selector 26. When the detected C/N value is greater than the preset C/N value, the C/N detection control means outputs the select signal such that the selector 26 selects the phase noise correction signal from the phase noise correction means 24.

The preset C/N value is set to a level of the C/N ratio at which the phase noise correction means 24 can possibly malfunction. Accordingly, if the detected C/N value is smaller than the preset C/N value, it is judged that the influence of noise is so great that the phase noise correction means 24 cannot operate normally, and thus the output of the phase noise correction means 24 is shut off.

On the other hand, if the detected C/N value is greater than the preset C/N value, it is judged that the phase noise correction means 24 is operating normally; accordingly, the output of the phase noise correction means 24 is supplied to the loop filter 23c. In this manner, control is carried out in accordance with the C/N ratio, whereby the quality of the phase noise correction control can be further improved.

Figure 15:
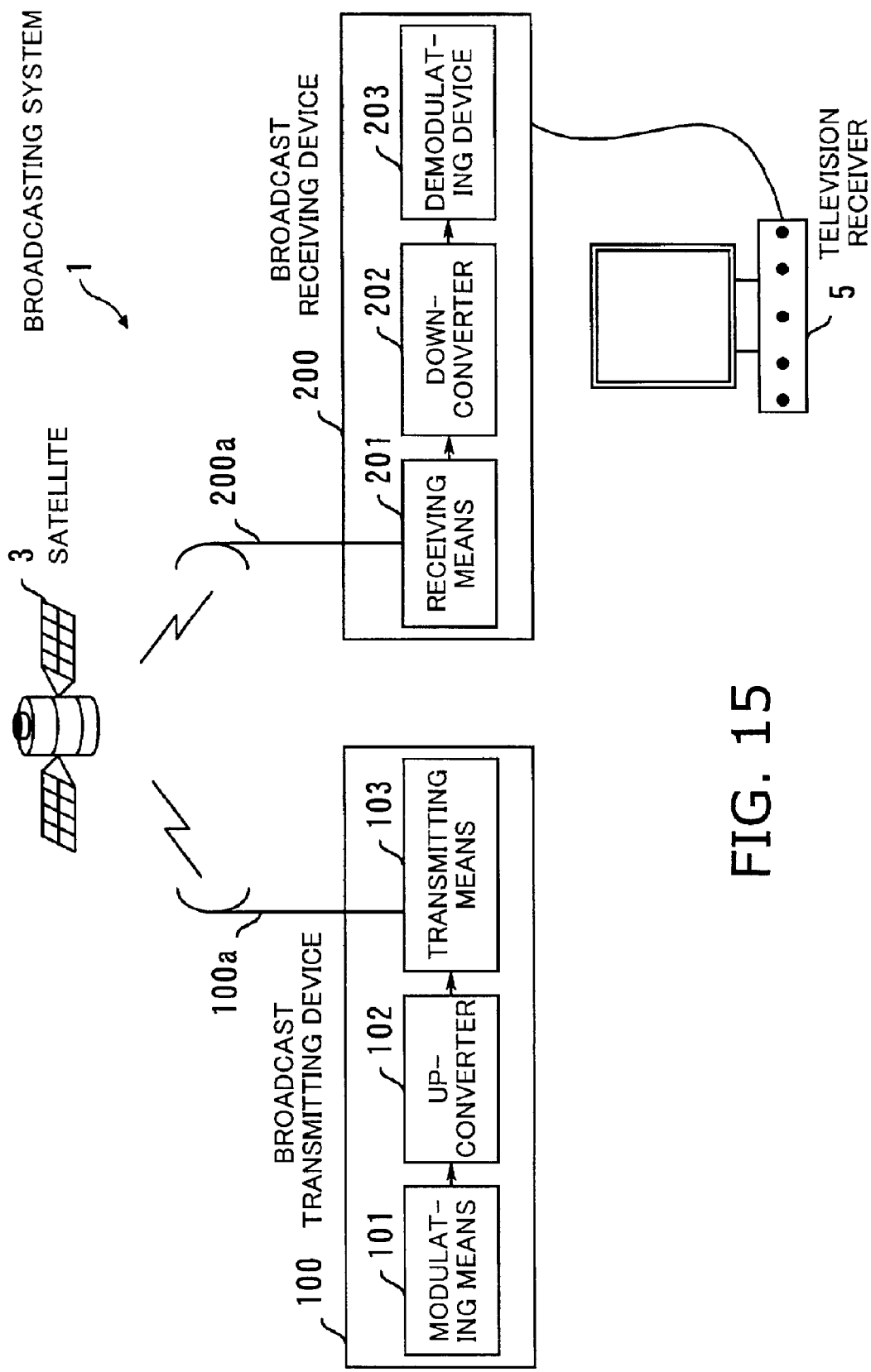
FIG. 15 is a diagram schematically showing the configuration of a broadcasting system.
Figure 16:
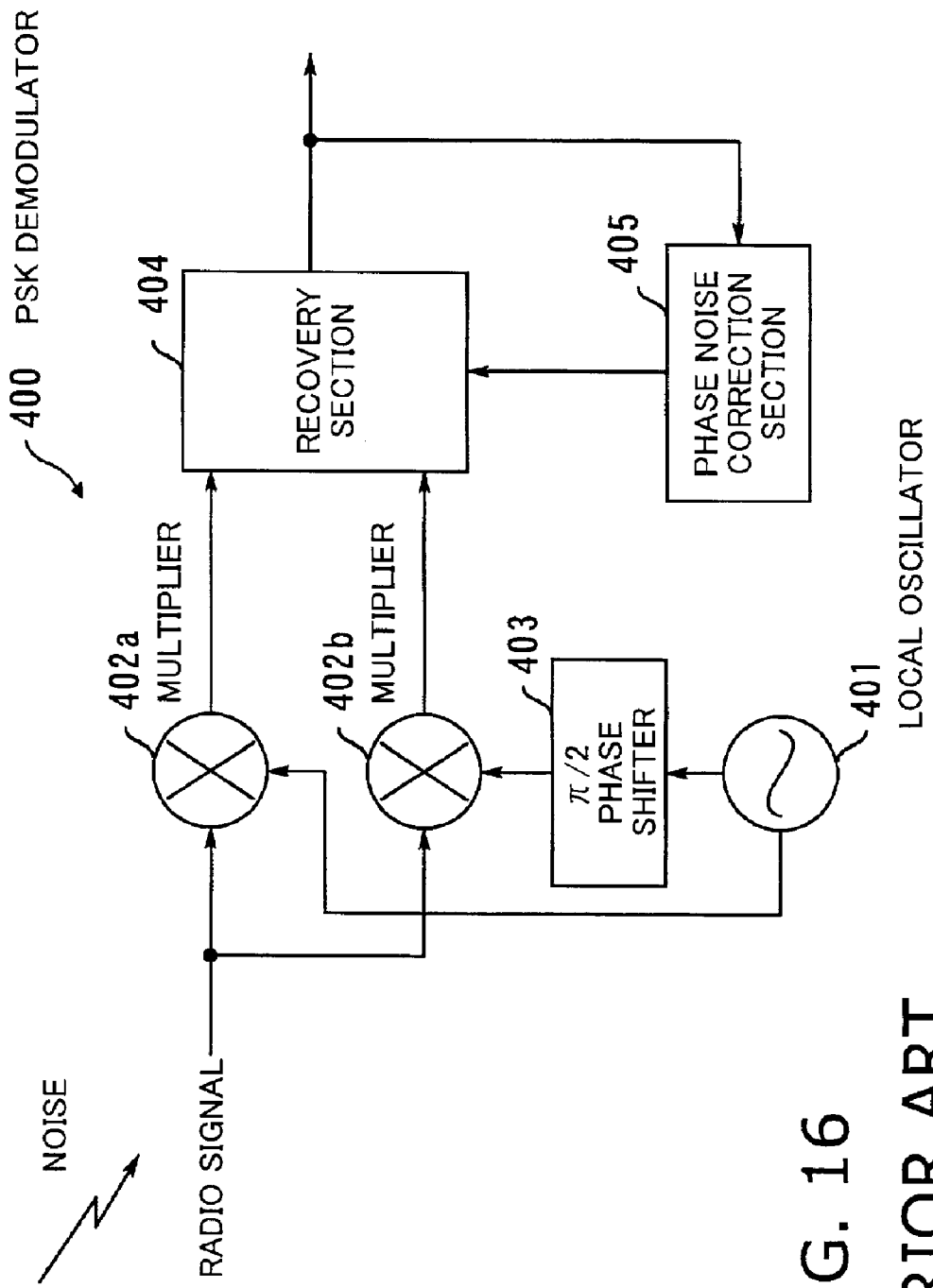
FIG. 16 is a diagram schematically showing the configuration of a conventional PSK demodulator.

A broadcasting system and a broadcast receiving device, to which the demodulating device of the present invention is applied, will be now described. FIG. 15 schematically shows the configuration of such a broadcasting system. The broadcasting system 1 comprises a broadcast transmitting device 100, a broadcast receiving device 200 connected to a television receiver 5, and a satellite 3.

Modulating means 101 of the broadcast transmitting device 100 modulates a signal to be transmitted, thereby generating a modulated signal. An up-converter 102 converts the modulated signal to a radio signal. Transmitting means 103 transmits the radio signal from an antenna 100a to the satellite 3.

Receiving means 201 of the broadcast receiving device 200 receives, via an antenna 200a, a signal transmitted from the satellite 3 toward the ground, and amplifies the received signal by means of an LNA (Low Noise Amplifier). A down-converter 202 performs frequency conversion (conversion to intermediate frequency band) of the amplified received signal, and then limits the band of the resulting signal by means of a BPF (Band-Pass Filter), thereby obtaining a signal to be demodulated.

A demodulating device 203 (which has the configuration of one of the first to fourth embodiments described above) controls demodulation of the signal which is output from the down-converter 202 and which has been modulated on the transmitting side. Subsequently, in a decoder section (not shown), reproduction of MPEG motion pictures etc. is performed to obtain reproduced data, which is then supplied to the television receiver 5. The television receiver 5 displays the reproduced signal. The demodulating device of the present invention is in practice fabricated as a semiconductor device in which a circuit element for demodulating the modulated signal is integrated on an identical substrate.

As described above, according to the present invention, the phase noise correction control is performed in conjunction with the carrier recovery in a manner such that when the output of the phase comparator 23b has increased on the positive side, a value equal to the increase is output to the loop filter 23c, and that when the output of the phase comparator has increased on the negative side, a value obtained by multiplying the increase by "−1" is output to the loop filter 23c. This enables high-efficiency, high-accuracy phase noise correction control which is far less susceptible to noise included in the radio signal, making it possible to improve the quality and reliability of radio communication control. Although in the foregoing description, the demodulating device is applied to a receiving device for satellite communications by way of example, the present invention is applicable to a wide range of receiving devices designed for radio communications other than satellite communications.

As described above, in the demodulating device according to the present invention, when the phase difference between the digital signals corresponding to the respective phase axes has increased on the positive side, a phase noise correction signal having a value equal to the increase is generated, and when the phase difference has increased on the negative side, a phase noise correction signal having a value obtained by multiplying the increase by "−1" is generated. Then, based on the phase noise correction signal, a gain for the phase difference between the timing-recovered digital signals is set, and symbols are rotated in a direction to suppress the phase noise in accordance with an oscillation signal generated based on the gain, to recover the carrier. This enables high-efficiency, high-accuracy phase noise correction control which is far less susceptible to noise included in the radio signal, whereby the quality and reliability of radio communication control can be improved.

Also, in the broadcasting system according to the present invention, the phase noise correction signal is generated on the broadcast receiving side in a manner such that when the phase difference between the digital signals corresponding to the respective phase axes has increased on the positive side, the phase noise correction signal takes a value equal to the increase, and that when the phase difference has increased on the negative side, the phase noise correction signal takes a value obtained by multiplying the increase by "−1". Then, based on the phase noise correction signal, a gain for the phase difference between the timing-recovered digital signals is set, and symbols are rotated in a direction to suppress the phase noise in accordance with an oscillation signal generated based on the gain, to recover the carrier. This enables high-efficiency, high-accuracy phase noise correction control which is far less susceptible to noise included in the radio signal, whereby the quality and reliability of radio communication control can be improved.

Further, in the semiconductor device according to the present invention, when the phase difference between the digital signals corresponding to the respective phase axes has increased on the positive side, a phase noise correction signal having a value equal to the increase is generated, and when the phase difference has increased on the negative side, a phase noise correction signal having a value obtained by multiplying the increase by "−1" is generated. Then, based on the phase noise correction signal, a gain for the phase difference between the timing-recovered digital signals is set, and symbols are rotated in a direction to suppress the phase noise in accordance with an oscillation signal generated based on the gain, to recover the carrier. This enables high-efficiency, high-accuracy phase noise correction control which is far less susceptible to noise included in the radio signal, whereby the quality and reliability of radio communication control can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A demodulating device for demodulating a modulated signal, comprising:

a digital signal generating portion for synchronously detecting a modulated input signal and then subjecting the input signal to A/D conversion to generate digital signals corresponding to respective phase axes;

a timing recovery portion for extracting symbol timing of the digital signals to recover the timing;

a carrier recovery portion for setting a gain for a phase difference between the timing-recovered digital signals in accordance with a phase noise correction signal, and rotating symbols in a direction to suppress phase noise in accordance with an oscillation signal generated based on the gain, to recover a carrier; and a phase noise correction portion for outputting the phase noise correction signal which takes a value equal to an increase of the phase difference when the phase difference has increased on a positive side, and which takes a value obtained by multiplying an increase of the phase difference by "−1" when the phase difference has increased on a negative side.

2. The demodulating device according to claim 1, wherein the carrier recovery portion includes a phase comparator for detecting the phase difference between I- and Q-channel digital signals, a loop filter for smoothing the phase difference and outputting the gain, a numerically controlled oscillator for outputting the oscillation signal in accordance with the output gain of the loop filter, a function generator for generating, based on the oscillation signal, a function value by which the symbols are to be rotated, and a complex multiplier for performing computation using the digital signals and the function value, and rotating the symbols to generate a baseband signal.

3. The demodulating device according to claim 2, wherein the loop filter performs one of first gain setting in which the gain is set by adding the value of the phase noise correction signal to the phase difference, and second gain setting in which the gain is autonomously set in accordance with the value of the phase noise correction signal.

4. The demodulating device according to claim 1, wherein the phase noise correction portion outputs the phase noise correction signal in a manner such that, provided a phase difference delayed by one symbol is a, and a current phase difference is b, an output c of the phase noise correction signal is set as follows:

if $a>0$ and also if $b-a>0$, $c=b-a$ $(>0)$;

if $a<0$ and also if $b-a<0$, $c=b-a$ $(<0)$; and if a and b do not meet either of conditions associated with the equations, $c=0.$ 5. The demodulating device according to claim 1, wherein the phase noise correction portion outputs the phase noise correction signal in a manner such that, provided an average value of phase differences from the one which is n symbols before a current phase difference to the one which is m (n>m) symbols before the current phase difference is a, and an average value of phase differences from the one which is m−1 symbols before the current phase difference to the current phase difference is b, an output c of the phase noise correction signal is set as follows:

if $a>0$ and also if $b-a>0$, $c=b-a$ $(>0)$;

if $a<0$ and also if $b-a<0$, $c=b-a$ $(<0)$; and if a and b do not meet either of conditions associated with the equations, $c=0.$ 6. The demodulating device according to claim 1, wherein the phase noise correction portion outputs the phase noise correction signal in a manner such that, provided an average value of phase differences from the one which is n symbols before a current phase difference to the one which is m (n>m) symbols before the current phase difference is a, an average value of phase differences from the one which is m−1 symbols before the current phase difference to the current phase difference is b, and a threshold is th, an output c of the phase noise correction signal is set as follows:

if $a>0$ and also if $b-a>th$, $c=b-a$ $(>0)$;

if $a<0$ and also if $b-a<th$, $c=b-a$ $(<0)$; and if a and b do not meet either of conditions associated with the equations, $c=0.$ 7. The demodulating device according to claim 1, further comprising a C/N detection control portion for detecting C/N from an output of the carrier recovery portion, the C/N detection control portion controlling the output of the phase noise correction signal in accordance with the detected C/N.

8. A broadcasting system for performing digital satellite broadcast communications, comprising:
 a broadcast transmitting device including a modulating portion for modulating a signal to be transmitted thereby to generate a modulated signal, an up-converter for converting the modulated signal to a radio signal, and a transmitting portion for transmitting the radio signal from an antenna to a satellite; and
 a broadcast receiving device including a receiving portion for receiving a signal transmitted from the satellite toward ground, a down-converter for subjecting the received signal to frequency conversion thereby to generate a signal to be demodulated, a digital signal generating portion for synchronously detecting the signal which is output from the down-converter and which has been modulated on a transmitting side, and then subjecting the signal to A/D conversion to generate digital signals corresponding to respective phase axes, a timing recovery portion for extracting symbol timing of the digital signals to recover the timing, a carrier recovery portion for setting a gain for a phase difference between the timing-recovered digital signals in accordance with a phase noise correction signal, and rotating symbols in a direction to suppress phase noise in accordance with an oscillation signal generated based on the gain, to recover a carrier, and a phase noise correction portion for outputting the phase noise correction signal which takes a value equal to an increase of the phase difference when the phase difference has increased on a positive side, and which takes a value obtained by multiplying an increase of the phase difference by "−1" when the phase difference has increased on a negative side.

9. A broadcast receiving device for use in digital satellite broadcasting for demodulating a modulated signal, comprising:
 a receiving portion for receiving a signal transmitted from a satellite toward ground;
 a down-converter for subjecting the received signal to frequency conversion thereby to generate a signal to be demodulated;
 a digital signal generating portion for synchronously detecting the signal which is output from the down-converter and which has been modulated on a transmitting side, and then subjecting the signal to A/D conversion to generate digital signals corresponding to respective phase axes;
 a timing recovery portion for extracting symbol timing of the digital signals to recover the timing;
 a carrier recovery portion for setting a gain for a phase difference between the timing-recovered digital signals in accordance with a phase noise correction signal, and rotating symbols in a direction to suppress phase noise in accordance with an oscillation signal generated based on the gain, to recover a carrier; and
 a phase noise correction portion for outputting the phase noise correction signal which takes a value equal to an increase of the phase difference when the phase difference has increased on a positive side, and which takes a value obtained by multiplying an increase of the phase difference by "−1" when the phase difference has increased on a negative side.

10. A semiconductor device in which a circuit element for demodulating a modulated signal is integrated on an identical substrate, comprising:

a digital signal generating portion for synchronously detecting a modulated input signal and then subjecting the input signal to A/D conversion to generate digital signals corresponding to respective phase axes;

a timing recovery portion for extracting symbol timing of the digital signals to recover the timing;

a carrier recovery portion for setting a gain for a phase difference between the timing-recovered digital signals in accordance with a phase noise correction signal, and rotating symbols in a direction to suppress phase noise in accordance with an oscillation signal generated based on the gain, to recover a carrier; and a phase noise correction portion for outputting the phase noise correction signal which takes a value equal to an increase of the phase difference when the phase difference has increased on a positive side, and which takes a value obtained by multiplying an increase of the phase difference by "−1" when the phase difference has increased on a negative side.

* * * * *